(12) United States Patent
Alfieri

(10) Patent No.: US 6,502,617 B2
(45) Date of Patent: Jan. 7, 2003

(54) GROUP FOR JOINING CLOSED-LOOP ABRASIVE BELTS

(75) Inventor: Maurizio Alfieri, Turin (IT)

(73) Assignee: Metis SRL, Turin (IT)

( * ) Notice: Subject to any disclaimer, the term of this patent is extended or adjusted under 35 U.S.C. 154(b) by 68 days.

(21) Appl. No.: 09/838,193

(22) Filed: Apr. 20, 2001

(65) Prior Publication Data

US 2001/0032709 A1 Oct. 25, 2001

(30) Foreign Application Priority Data

Apr. 21, 2000 (IT) .......................................... TO00A0381

(51) Int. Cl.[7] ............................................... B65H 21/00
(52) U.S. Cl. ................. 156/507; 156/304.1; 156/304.5; 156/502; 156/509
(58) Field of Search .............................. 156/304.5, 502, 156/507, 508, 509, 304.1

(56) References Cited

U.S. PATENT DOCUMENTS

| | | | | |
|---|---|---|---|---|
| 2,309,305 A | * | 1/1943 | Dahlstrom et al. | 156/137 |
| 2,350,861 A | * | 6/1944 | Argy et al. | 156/137 |
| 2,660,220 A | * | 11/1953 | Hawkins | 156/137 |
| 2,794,726 A | * | 6/1957 | Riedesel et al. | 156/137 |
| 4,008,545 A | * | 2/1977 | Koide et al. | 156/509 |
| 5,196,084 A | * | 3/1993 | Maurizio | 156/583.5 |
| 5,403,413 A | * | 4/1995 | Masuda | 156/157 |

* cited by examiner

Primary Examiner—Mark A. Osele
(74) Attorney, Agent, or Firm—Sughrue Mion, PLLC

(57) ABSTRACT

A group for joining the ends of closed-loop abrasive belts, including a machine for the preparation of the end edges of the strips of abrasive belt and an assembling machine including a support arm around which the strips of abrasive belt are wound in a closed loop, and a press unit for joining the relative end edges. The input end of the support arm of the assembling machine is situated immediately next to and on the extension of the edge preparation machine.

5 Claims, 4 Drawing Sheets

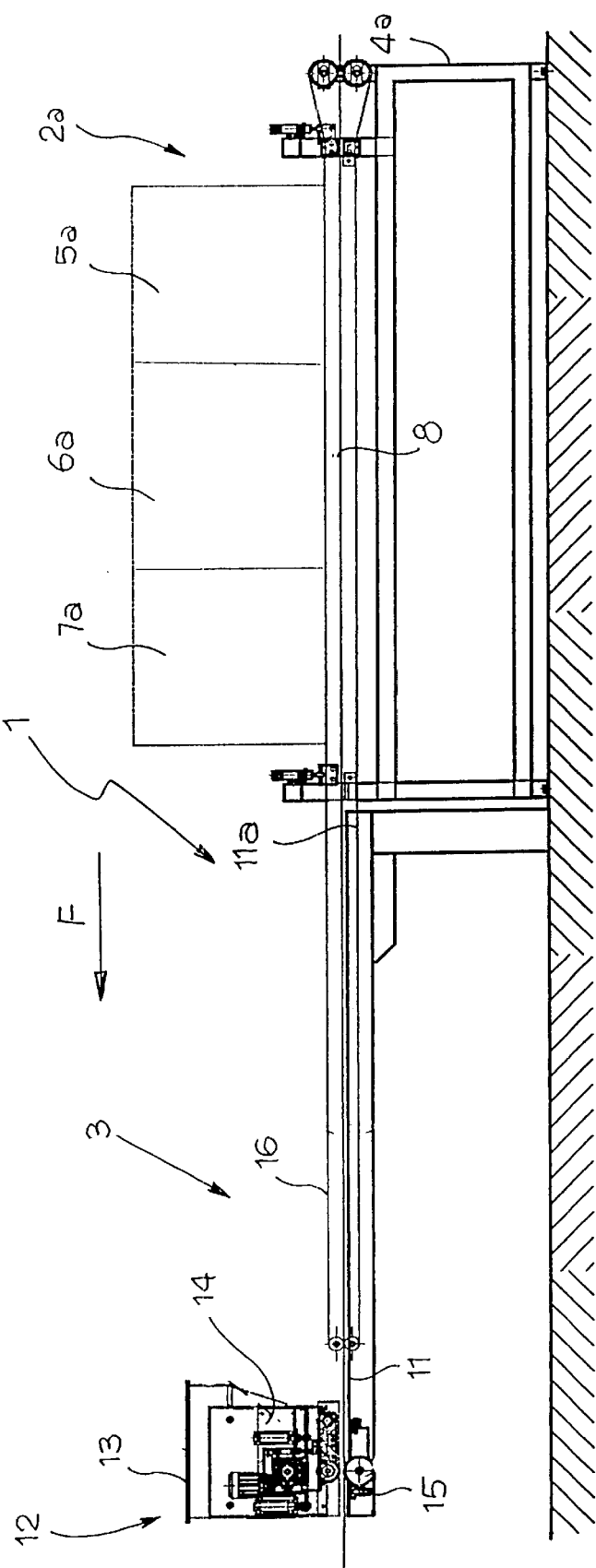

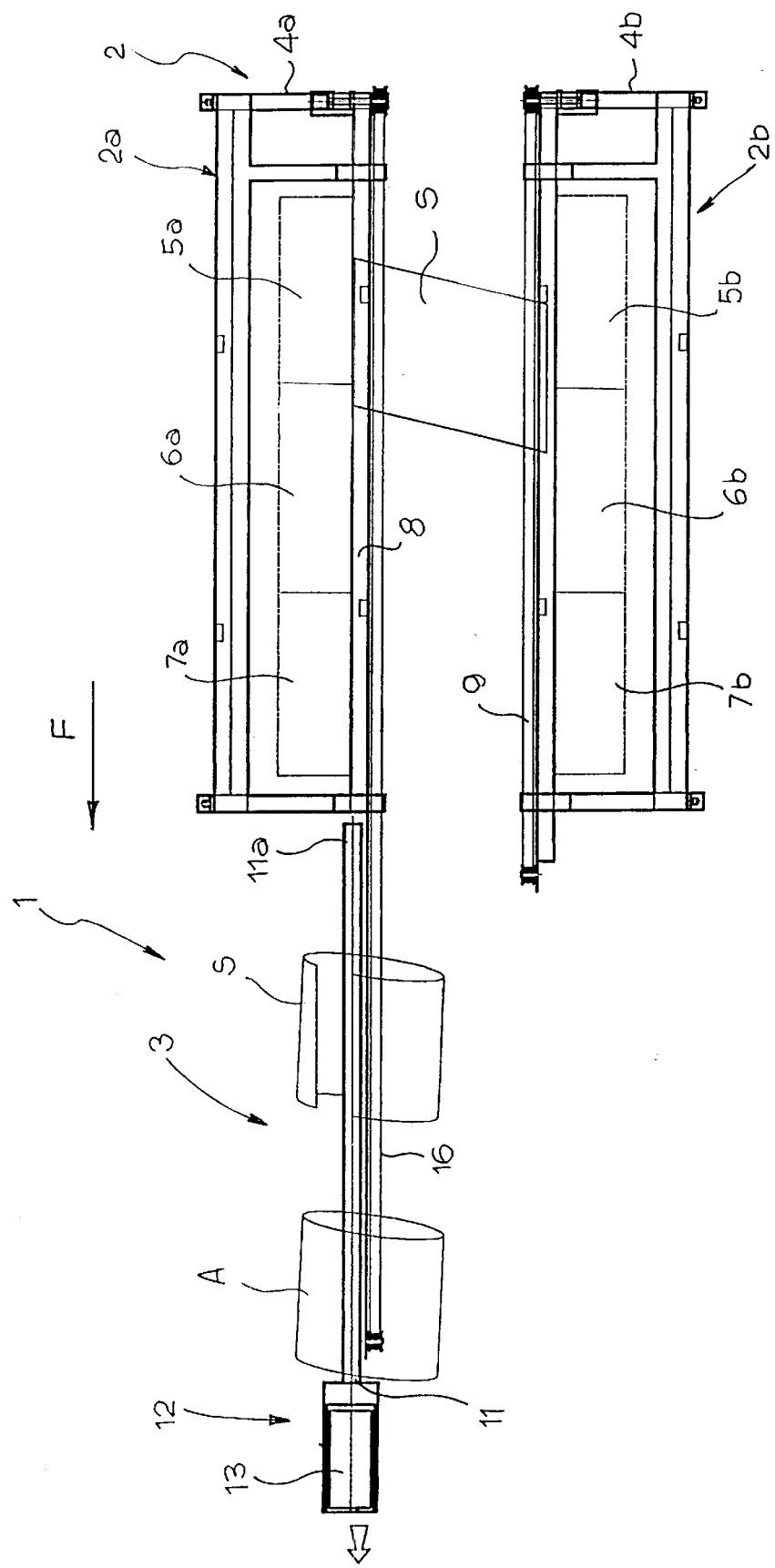

GROUP FOR JOINING CLOSED-LOOP ABRASIVE BELTS

FIELD OF THE INVENTION

The present invention refers in general to the production of abrasives produced using flexible support media, such as paper, cloth, plastic laminates and similar.

More in detail, the invention concerns a group for joining such closed-loop abrasive belts, of the type including a machine for preparing the end edges of strips of abrasive belt via chamfering, application of a liquid adhesive and drying of the adhesive, and an assembling machine for the said end edges, including a support arm around which the said belt strips are wound in a loop and a press unit for joining the said end edges.

Such groups have been produced and successfully commercialised by the Applicant for a long time. The two machines that form the group have traditionally consisted of autonomous and independent entities, normally installed by the producers of closed-loop abrasive belts in different stations, often far apart. During production, this necessitates manually removing the strips of abrasive belt from the edge preparation machine and transferring them, again manually, to the assembling machine.

This assembling machine may have a generally similar layout to that described and illustrated, even if simplified, in American patent U.S. Pat. No. 5,196,084. In this layout, the support arm of the assembling machine is joined at one end to the structure of the machine; as a result, to effect assembling of the closed-loop abrasive belt, the operator must necessarily close the end edges beyond the fixed end of the support arm, and then move the loop that is formed to the press unit that, when processing is completed, will expel the closed-loop belt that has been produced via the free end of the support arm.

SUMMARY OF THE INVENTION

The object of this invention is that of rationalizing the structural and functional layout of the previously defined joining group, rendering the phases of transferring the belt strips from the edge preparation machine to the assembling machine, as well as the operations of introducing the strips around the support arm of the said assembling machine, easier and more practical.

According to the invention, the above objectives are essentially achieved due to the fact that the said support arm of the assembling machine has its input end situated immediately next to and on the extension of the said edge preparation machine.

Thanks to this solution, transfer of the strips of abrasive belt from the preparation machine to the assembling machine is rendered direct and immediate, thereby allowing the group's production rate to be significantly increased. The production rate can be increased even further by avoiding manual operator intervention for this transfer. To achieve this, a transfer device, which could conveniently consist of an extension to the motorised conveyor belt that the preparation machine is normally equipped with, running to the press unit, could be operationally associated with the support arm.

BRIEF DESCRIPTION OF THE DRAWINGS

Additional characteristics and advantages of the invention will become evident in the detailed description that follows, with reference to the attached drawings, which are supplied purely as a non limitative example, where:

FIG. 3 is a similar diagram to FIG. 1, showing a second embodiment of the group for joining closed-loop abrasive belts according to the invention, and FIG. 4 is a plan view from above of FIG. 3.

DETAILED DESCRIPTION OF THE INVENTION

Figure 1:
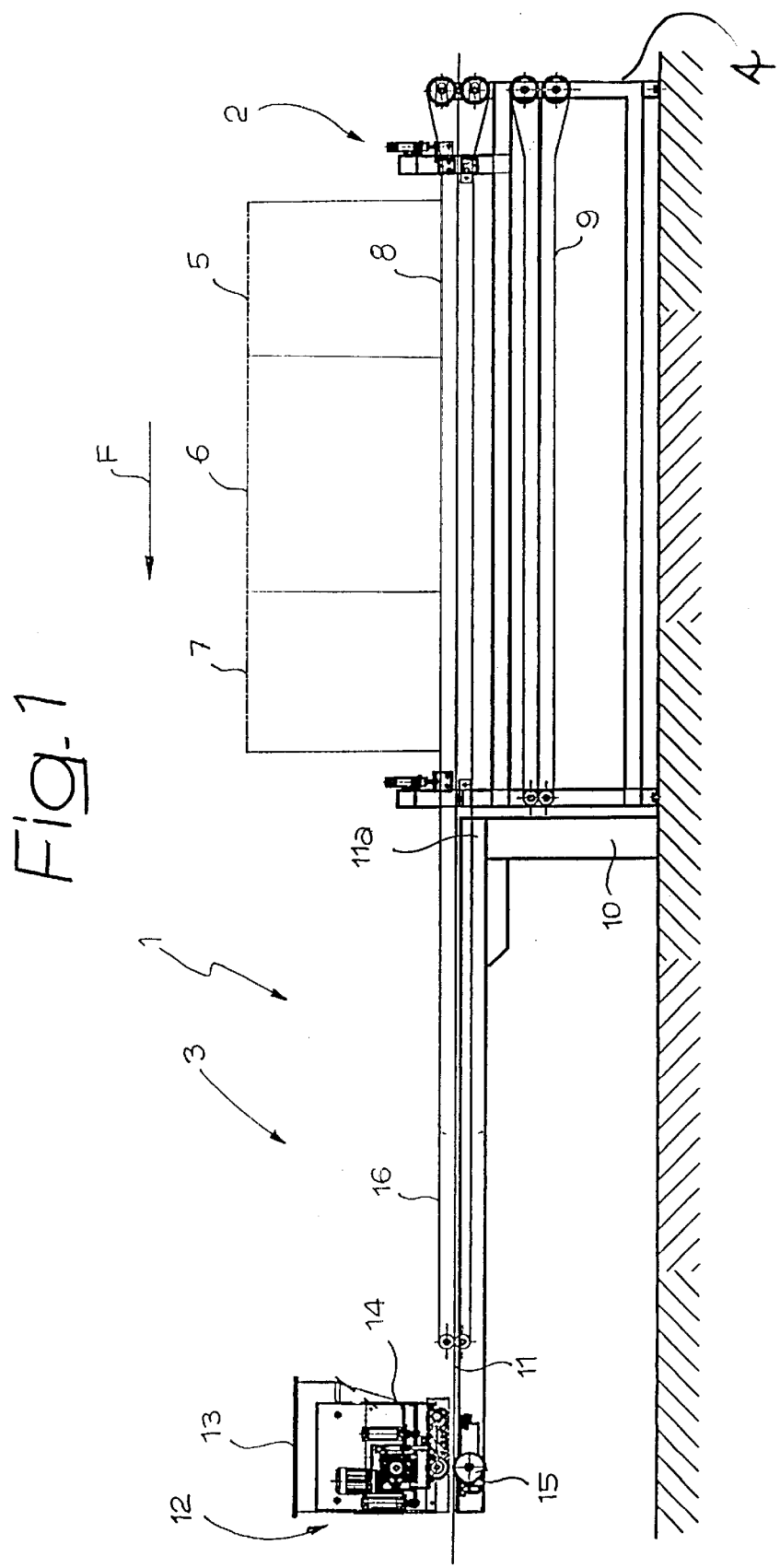
FIG. 1 is a simplified diagram of a group for joining closed-loop abrasive belts according to the first embodiment of the invention.
Figure 2:
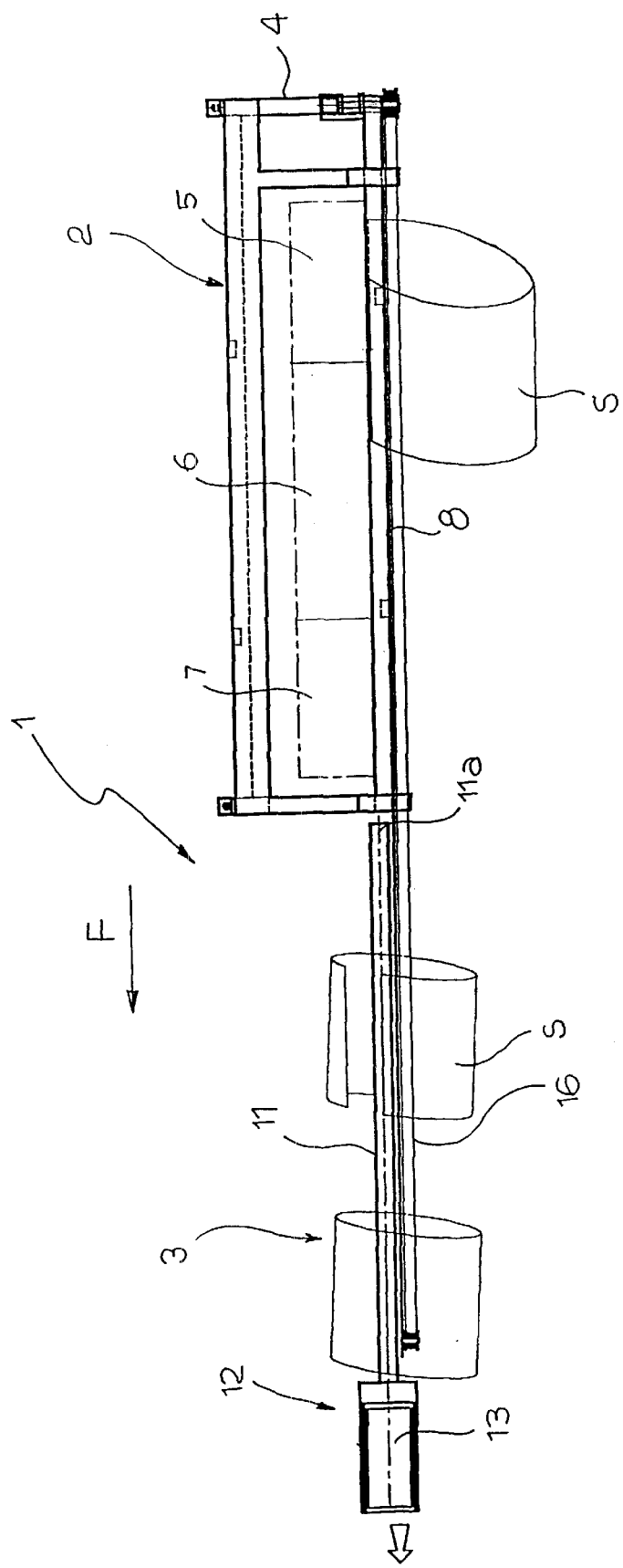
FIG. 2 is a plan view from above of FIG. 1.

Initially referring to FIGS. 1 and 2, item 1 indicates the overall group for producing closed-loop abrasive belts A (FIG. 2) from flexible strips S of predetermined length.

The group 1 consists of a preparation machine 2 and an assembling machine 3 located next to each other with one on the extension of the other in the direction of advancement of the strips S and the closed-loop belts A, indicated in the drawings by arrow F.

The preparation machine 2 has a generally conventional configuration including, in the case of the illustrated example, a framework 4 on which successive operational units are arranged in the direction of arrow F. These units, schematically indicated as items 5, 6 and 7 respectively chamfer the end edges of the strips S, apply a liquid adhesive on these edges and partially dry the adhesive. An additional operational unit, not indicated in the drawings for simplicity, for applying a reinforcement film to the end edges of the strips S could also be incorporated into the design.

The preparation machine 2 is normally equipped with a motorized conveyor device for subsequent transfer of the strips S through the units 5, 6 and 7: in the example illustrated in FIGS. 1 and 2, this conveyor device is formed by a pair of transporters 8 and 9, one above the other, each of which consists of a pair of closed-loop belts between which the areas of the strips S next to the end edges are clamped.

The assembling machine 3 is also generally conventional, except for a fundamental characteristic specified below. It includes a framework 10 carrying a support arm 11 that extends from immediately next to the outlet end of the preparation machine 2 up to a press unit 12. This press unit 12 includes, in the generally normal manner, a fixing plate 13, an upper press element 14 and a lower press element 15. The fundamental aspect of the invention lies in the fact that the entrance end of the support arm 11, indicated as 11a, is directly accessible by the strips of abrasive belt S leaving the preparation machine 2, which are wound in a loop around the said support arm 11 for transfer to the press unit 12, as shown in FIG. 2.

The winding of the strips S to gradually form the closed loops A and the passage of these closed loops A through the press unit 12 can be performed manually, or automatically, using a transport device in the direction F, operatively associated with the support arm 11. In the case of the illustrated example, this transport device is formed by an auxiliary conveyor 16, which could opportunely consist of an extension to the same conveyor 8 of the preparation machine 2.

The variant of the joining group shown in FIGS. 3 and 4 is generally similar to the embodiment previously described with reference to FIGS. 1 and 2, and only the differences will be described in detail, using the same numeric references for identical or similar parts. In this variant, the preparation machine 2 is composed of two units 2a and 2b side-by-side and opposed, instead of one above the other, each of which includes its own support framework 4a and 4b, one carrying a conveyor 8 and the other a conveyor 9, and the operational units 5a, 6a, 7a and 5b, 6b, 7b. The two units 2a and 2b respectively prepare one end edge each of the strips of abrasive material S. In this case as well, each unit 2a and 2b can be equipped with an additional operational unit, not indicated in the drawings for simplicity, for applying a reinforcement film to the end edges of the strips S.

The assembling machine 3, identical to that previously described, is arranged on the extension of one of the two opposed units 2a and 2b; in the example illustrated, this unit is 2a, with the entrance end 11a of the relative support arm 11 arranged immediately next to the outlet of the said unit 2a. Also in this case, a motorized transfer device 16, opportunely composed of an extension of conveyor 8 of unit 2a, can be used for the formation of the closed loops A and their transfer through the press unit 12.

Naturally, the constructional details and the forms of realization could be extensively changed with respect to that described and illustrated without leaving the scope of this invention, as defined in the following claims.

What is claimed is:

1. A group for joining closed-loop abrasive belts, including a machine for the preparation of end edges of abrasive belt strips via chamfering, application of a liquid adhesive and drying of the adhesive, and an assembling machine for joining the said end edges, including a support arm around which the said strips of belt are wound in a closed loop, and a press unit for joining the said end edges, the said support arm of the assembling machine having an input end situated immediately next to and on the extension of the said preparation machine for the the preparation of said end edges of said abrasive belt strips.

2. A group according to claim 1, further comprising a transport device is operatively associated with said support arm and running towards the said press unit.

3. A group according to claim 2, in which the said preparation machine is equipped with a motorized conveyor device and the said transport device is formed by an extension of the said conveyor along the said support arm.

4. A group according to claim 3, wherein the said preparation machine includes two sections superimposed to each other for the simultaneous preparation of the respective edges of the said strips of abrasive belt.

5. A group according to claim 3, wherein the said preparation machine includes two mutually opposed sections for the simultaneous preparation of the respective edges of the said strips of abrasive material.

* * * * *